Aug. 1, 1950  J. F. WALSH ET AL  2,517,149
APPARATUS FOR SEPARATING WHEAT STARCH AND GLUTEN
Original Filed Nov. 1, 1944
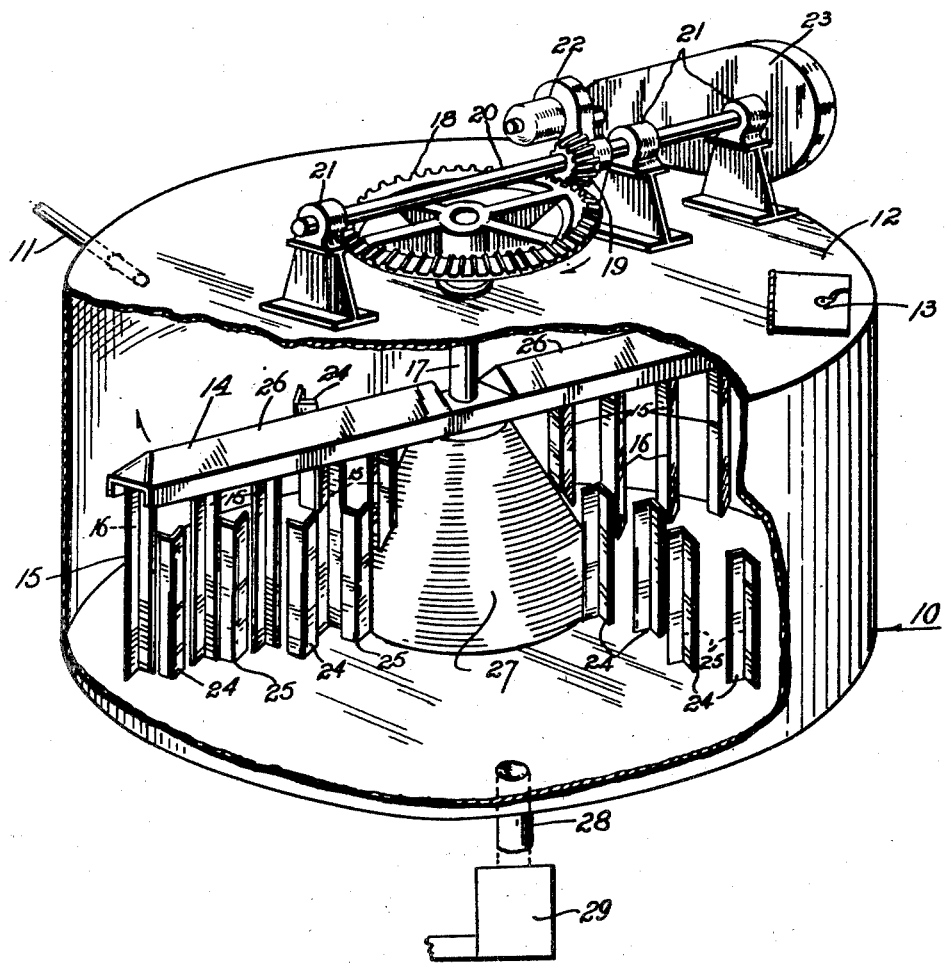
Inventors.
James F. Walsh
& David M. Levitt
Abraham H. Goodman
by Roland C. Rehm
Attorney.

Patented Aug. 1, 1950

2,517,149

UNITED STATES PATENT OFFICE 2,517,149

APPARATUS FOR SEPARATING WHEAT STARCH AND GLUTEN

James F. Walsh, Holland, Mich., David M. Levitt, Great Neck, N. Y., and Abraham H. Goodman, Holland, Mich., assignors to Doughnut Corporation of America, New York, N. Y., a corporation of New York Original application November 1, 1944, Serial No. 561,476. Divided and this application December 6, 1947, Serial No. 790,206

3 Claims. (Cl. 127—24)

This invention relates to the separation and recovery of wheat starch and high purity wheat gluten, and among other objects aims to provide a simple and improved apparatus for hydrating the wheat gluten and for sub-dividing it to permit separation thereof from the wheat starch.

Another object of the invention is to provide apparatus in which the foregoing operations may take place without intervening handling of the gluten at phases in the process where the gluten is extremely difficult to handle.

A further object of the invention is to provide an apparatus which will permit the separation and recovery of wheat starch and gluten quickly and in such high purity and concentration as to avoid deterioration and permit subsequent economical processing thereof.

This application is a division of our co-pending application Serial 561,476.

The nature of the invention may be readily understood by reference to one illustrative apparatus embodying the invention and shown in the accompanying drawing.

In the drawing the figure is a perspective view, (party broken away to illustrate the interior) of apparatus embodying the invention.

The valuable constituents of wheat flour can be economically and practically utilized only if they are both economically recovered without substantial deterioration in relatively pure and concentrated form. The term flour is used in a generic sense to include the various types of flour, patent, clears etcetera, and other forms of comminuted wheat from which most of the cellulosic materials (bran and shorts) and the germ have been separated by dry milling. Heretofore, wheat gluten has been recovered by hydrating wheat flour to form a dough and then washing out the starch with an excess of water. Although the gluten was reasonably pure and free from starch, the resulting starch slurry was in an extremely dilute form and contained an excess of gluten which not only deteriorated rapidly and before the starch could be concentrated, but contaminated the starch and precluded its use for purposes (requiring reasonably pure starch) which would yield an adequate profit.

For the first time the present apparatus makes possible the recovery from wheat flour both gluten of at least 75% protein content and the starch in a slurry of such concentration as to contain from 15 to 24% starch solids and not more than 2 to 4% solubles including both soluble and insoluble protein. We have discovered (and claimed in our co-pending application Serial 562,980, now Pat. No. 2,442,789) a starch slurry of this character may be acid converted directly to purified dextrose without intervening concentration or removal of solubles. While a starch slurry of this purity and concentration has other uses, such as in the fermentation industries, a greater profit therefrom is obtainable by concentration to high purity dextrose.

Gluten of 75% and higher purity obtainable by the present apparatus, is also capable of conversion into high quality products such as monosodium glutamate, an ingredient in preparation of food products of the greatest value, and various forms of food products for human consumption.

The illustrative apparatus provides means for hydrating and developinng the cohesive strength of the gluten without dispersing it in water in such form that is cannot be mechanically or easily recovered. The same apparatus functions without intervening handling or opportunity for deterioration, to sub-divide the hydrated gluten into small curds or pieces which may readily be separated in purified conditions from the starch slurry. The invention is here illustrated in apparatus comprising a circular cylindrical tank 10 for holding a charge of flour and water. Preferably the water including the initial water content of the flour is limited to aggregate from 85 to 115% of the dry weight of the flour. Within these limits the water should preferably not exceed that necessary to make a soft dough. The water may advantageously be heated to about 50° C. to improve the characteristics of the dough and to minimize the amount of water used during the hydrating stage. The water temperature should not be high enough (preferably below 130° F.) to hydrate or paste the starch in the flour.

Water may be introduced through a pipe diagrammatically represented at 11 and flour through an opening in the top 12 of the tank, at other times closed by a movable cover 13.

Hydration of the gluten is facilitated by gentle stirring, in this case, with a rotating sweep in the form of a centrally pivoted arm 14 from which depend a series of spaced fingers 15 extending into close proximity with the bottom of the tank. The fingers are here shown in the form of angle members with the apex 16 of the angle on the leading face of the finger. Rotation is here shown as clockwise. Arm 14 is pivotally supported on a rotating shaft 17 co-axial with the tank and depending from the top 12. The shaft and arm are rotated by driving mechanism here represented by bevel gear 18 carried by shaft 17 and a bevel pinion 19 carried on drive shaft 20 supported in bearings 21 on tank top 12. The latter shaft is driven by electric motor 22 through variable speed reduction mechanism 23 by means of which the speed of travel of the fingers 15 through the dough may be adjusted.

Cooperating with the latter fingers are a plurality of series of stationary fingers 24, in this case upwardly projecting from the bottom of the tank and spaced to register with the spaces between moving fingers 15. Fingers 24 are likewise angular in section with the apex 25 of the angle at the leading face of the finger. Each series of fingers 24 is preferably in alignment so that the movable fingers pass through those of each series simultaneously.

Sweep arm 14 and the tops of fingers 24 lie above the maximum dough level in the tank. The top 26 of the sweep arm is sharply beveled to prevent accumulation of flour and dough thereon.

A conical shield 27 co-axial with shaft 17 prevents accumulation of dough on and near the shaft where it cannot be adequately treated.

During hydration of the gluten the speed of fingers 15 is adjusted to develop a gentle displacing action (as distinguished from mere agitation) which exposes all particles of the flour to the action of the water to hydrate the gluten, and gives the particles an opportunity to cohere and agglomerate. Such agitation as would cause dispersion of the minute particles of gluten in the water, is avoided. The shape and to coaction of the fingers is designed to produce a minimum of mere turbulence in the mixture and a maximum exposure of the particles of flour to the water. With such action the particles of gluten-containing flour hydrate readily and then cohere and agglomerate.

After the agglomeration has progressed to a point where danger of dispersion of the gluten in the water has passed, the relatively moving fingers then function to develop hydration to increase the cohesive strength of the gluten, by repeatedly stretching the dough between the stationary and moving fingers. The spaces (between the stationary fingers) through which the moving fingers pass is relatively close to prevent any substantial masses of dough from passing between the fingers and escaping the stretching action. This action both exposes the gluten to the water efficiently and particularly improves the adhesive bond between the gluten particles. Weakly bonded masses pull apart and thereby facilitate the further hydration necessary to improve and develope uniform cohesive strength throughout the mass of dough. As hydration progresses the mixture becomes increasingly stiffer and requires more power to work. It stretches into long strands between the relatively moving fingers. Development of cohesive strength of the gluten is important for the ensuing so-called "cutting" operation. Substantial completion of hydration, at least as regards the strength of the dough, is evident when the stretching quality of the dough ceases to increase, and also by a leveling off of power consumption. In its fully hydrated condition the dough is extremely adhesive in character and difficult to handle, and the ability to continue treatment of the dough without removal to other apparatus is of the greatest utility.

At this stage of the operation and without intervening handling of the dough in its adhesive condition, additional water (called "cutting" water) is added to the dough, preferably without interruption of rotation of the fingers. Such water is limited in amount so that when the gluten and starch slurry are finally separated, the slurry will contain about 15 to 24% starch solids. The cutting water is preferably wash water from a previous batch used (as described in our said co-pending applications) in a fine spray to wash from the gluten curds starch adhering thereto as the gluten passes over vibrating separating screens. This wash water is a very dilute starch slurry and is advantageously used as "cutting" water. The latter water is generally at tap temperatures, but in any event it should be less than 130° F. to avoid pasting or hydrating the starch.

In the presence of this additional water the moving fingers, which in the present case are the fingers previously used to mix and hydrate, function to "cut up" the gluten into small but screenable curds and simultaneously to wash the starch out of the masses of gluten. The sharp leading edges of the fingers assist in breaking up the elongated strands of dough, which in their elongated condition are efficiently exposed to the washing action of the added water. Speed of movement of the fingers may be increased during the "cutting" operation if desired. As the gluten is progressively washed free of starch and becomes purer and purer it also becomes relatively "short" (although in this condition it is extremely cohesive), so that the relatively moving fingers readily break up the gluten into small curds suspended in the starch slurry. Because of its relatively high starch content the latter slurry serves the very important function of preventing the curds from agglomerating into large masses which would be practically impossible to remove from the apparatus and which are extremely difficult to handle either manually or mechanically, adhering to any surface contacting therewith. However, in the presence of the relatively concentrated starch slurry, the contents of the tank is extremely fluid and there is no tendency of the particles of gluten to agglomerate or adhere to portions of the apparatus. The small gluten curds are in effect enveloped by and suspended in the starch slurry.

In this fluid condition the slurry and gluten curds may be readily conveyed either by gravity, or as in the present case by pumping, to the separating screens; and separated as described in said co-pending applications. In the present case a discharge pipe 28 connects with the bottom of the tank for withdrawing the contents to the pump diagrammatically represented at 29 by which the fluid material is simply and easily conveyed for such distance as may be necessary for delivery to the separating screens as aforesaid. After separation from the slurry and spraying with wash water to remove adhering starch, the gluten curds then cohere or agglomerate in large masses, but until delivery in this purified form and at no stage during the preceding treatment is it necessary to handle the dough by removal to another apparatus. (All treatment takes place in a single apparatus.)

The entire sequence of operations requires only about 20 to 40 minutes (depending on the size of the batch) including the separating steps which deliver purified gluten. There is therefore, no opportunity for deterioration of the gluten or the starch slurry. Each is in condition to be immediately converted into the final stable products.

The principle of the invention may be embodied in various forms of apparatus wherein the mixing, hydrating, and "cutting" functions are performed successively, either by the same or successively operating elements, without intervening handling of the dough in its highly adhesive condition. It is thus possible to recover both the gluten and the starch in the above described forms essential to produce high purity products and to obtain profitable operation.

Having described our invention, we claim:

1. In apparatus for separating wheat gluten and an aqueous starch slurry, the combination comprising a vessel for hydrating wheat flour, a series of stationary fingers, another series of moving fingers adapted to pass between the first named fingers to stir wheat flour and water gently to hydrate the gluten in the flour and to form a soft dough, the fingers of said respective series being relatively arranged so that all fingers of a series of moving fingers pass substantially simultaneously between a series of stationary fingers and the clearance between each stationary finger and the adjacent moving fingers is substantially uniform to prevent passage of large masses of dough between them, said fingers being adapted to stretch the dough repeatedly into long strands to facilitate hydration of the gluten, means for introducing additional water into said vessel after completion of hydration, said fingers having wedge-shaped leading edges to assist in cutting up the hydrated gluten into curds upon addition of said water, whereby said gluten may be hydrated and then sub-divided into curds without intervening handling, and means for operating said fingers.

2. In apparatus for separating wheat gluten and an aqueous wheat starch slurry, the combination comprising a hydrating vessel for holding a soft wheat flour dough and having a plurality of radial series of spaced vertical stationary fingers, a sweep arm rotating on a central axis and carrying a radial series of vertical fingers spaced to pass between the stationary fingers, said stationary and moving fingers being substantially uniformly spaced and arranged so that the fingers of one series of moving fingers pass simultaneously between a series of stationary fingers, each stationary finger passing midway between the adjacent moving fingers, the clearance between adjacent stationary and moving fingers being limited to prevent substantial masses of dough from passing unaffected between said fingers, thereby to insure stretching of the dough into long strands, said fingers being wedge-shaped in section with a sharp leading edge, means for operating said relatively moving fingers slowly during the initial phase of operation of said apparatus to avoid dispersing the gluten and to facilitate hydration of the wheat gluten and development of its cohesive strength and for operating said fingers at a higher speed during the latter phase of operations to subdivide the hydrated gluten into small curds suspending in the starch slurry, means for introducing separate charges of water into the vessel for the initial and later phases of operations, and a conduit for withdrawing the gluten curds in suspension in the fluid starch slurry at the conclusion of the operations.

3. In apparatus for separating wheat gluten and an aqueous wheat starch slurry, the combination comprising a hydrating vessel for holding a soft wheat flour dough and having a plurality of radial series of spaced vertical stationary fingers, a sweep arm rotating on a central axis and carrying a radial series of vertical fingers spaced to pass between the stationary fingers, said stationary and moving fingers being arranged so that all fingers of a series of moving fingers pass substantially simultaneously between a series of stationary fingers and the clearance between said each stationary finger and the adjacent moving fingers is substantially uniform to prevent substantial masses of dough from passing freely and unaffected between said fingers, thereby to insure stretching of the dough into long strands, said fingers being wedge-shaped in section with a sharp leading edge, means for actuating said relatively moving fingers slowly during the initial phase of operation of said apparatus to facilitate hydration of the wheat gluten and development of its cohesive strength and more rapidly during the latter phase of operation to subdivide the hydrated gluten into small curds suspended in the starch slurry, and means for introducing separate charges of water into the vessel for the initial and later phases of operations.

JAMES F. WALSH.
DAVID M. LEVITT.
ABRAHAM H. GOODMAN.

REFERENCES CITED

The following references are of record in the file of this patent:

UNITED STATES PATENTS

| Number | Name | Date |
|---|---|---|
| 28,324 | Brown | May 15, 1860 |
| 186,174 | Snead | Jan. 9, 1877 |
| 316,487 | Ross | Apr. 28, 1885 |
| 616,373 | Upton | Dec. 20, 1898 |
| 1,535,811 | Briggs | Apr. 28, 1925 |
| 1,948,453 | Barbade | Feb. 20, 1934 |

FOREIGN PATENTS

| Number | Country | Date |
|---|---|---|
| 5,742 | Great Britain | of 1894 |
| 88,092 | Sweden | Oct. 15, 1936 |